May 16, 1939. J. KIPPER 2,158,702
MEAT MOLD
Filed Feb. 4, 1937
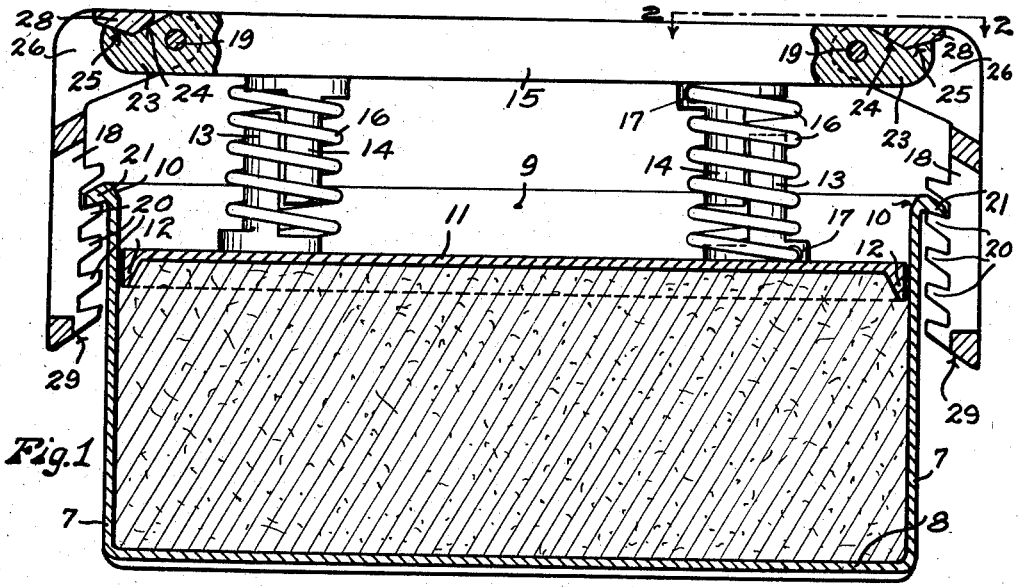
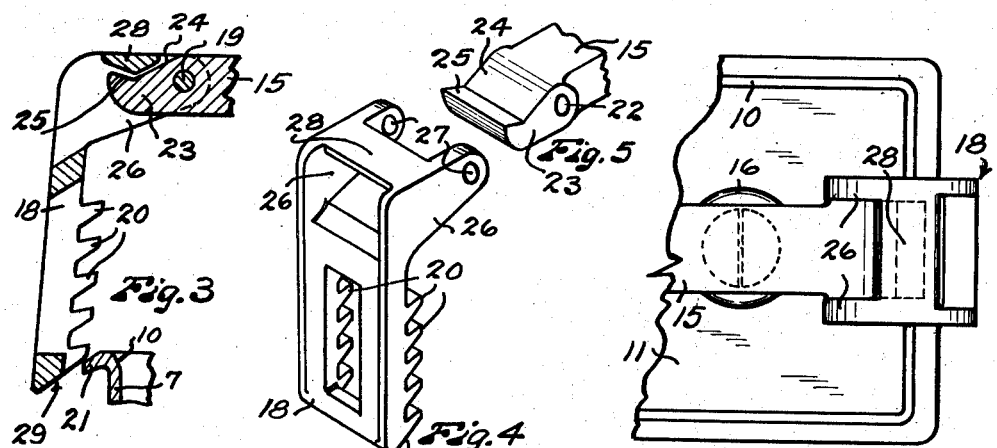
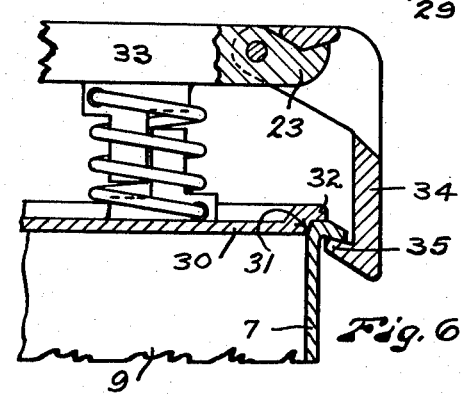
INVENTOR.
Joseph Kipper
BY
Fred C. Matheny
ATTORNEY Patented May 16, 1939

2,158,702

UNITED STATES PATENT OFFICE 2,158,702

MEAT MOLD

Joseph Kipper, Seattle, Wash.

Application February 4, 1937, Serial No. 124,087

2 Claims. (Cl. 53—22)

This invention relates to meat molds and is in the nature of an improvement on the meat molds disclosed in my prior Patents No. 1,581,640 issued April 20, 1926 and No. 1,856,564 issued May 3, 1932.

A primary object of this invention is to provide a meat mold of this nature having improved means for securing a removable closure member and retainer bar to a mold receptacle, said means facilitating the application of the closure member and retainer bar to the mold receptacle and relieving strain on pivot means by which certain latch members are connected with the retainer bar.

Other objects are to provide a meat mold of this nature which is strong and substantial in construction, neat in appearance, easy to manipulate, not expensive to manufacture, and one that is sanitary and easily cleaned and sterilized.

Other and more specific objects will be apparent from the following description taken in connection with the accompanying drawing.

In the drawing,

Fig. 1 is a longitudinal vertical section, with parts shown in elevation, of a meat mold constructed in accordance with this invention.

Fig. 2 is a fragmentary plan view substantially on broken line 2—2 of Fig. 1.

Fig. 3 is a fragmentary sectional view illustrating a position through which certain latch members will pass while they are being engaged with a receptacle.

Fig. 4 is a detached perspective view of a latch member embodied in the invention.

Fig. 5 is a fragmentary perspective view of the end portion of a retainer bar with which a latch member of the type shown in Fig. 4, is connected.

Fig. 6 is a fragmentary sectional view of a modified form of closure member embodied in the invention.

Like reference numerals designate like parts throughout the several views.

Referring to the drawing, I show a rectangularly shaped one piece mold receptacle having side walls 9, end walls 7 and a bottom wall 8. All corners within the mold receptacle are neatly rounded to avoid forming pockets which are unsanitary and difficult to clean and the top edge of the mold is inclined outward slightly, as at 10, to facilitate the insertion therein of a closure member in the nature of a presser plate 11 which forms a telescopic cover adapted to fit into the mold. The edges of the presser plate 11 are flanged downwardly as at 12 to afford a better bearing against the sides of the mold and to form a concave surface on the side of the presser plate next to the meat. The presser plate fits closely within the mold so that the meat can not be forced upwardly between the wall of the mold and the edge of the presser plate.

The presser plate 11 has two upwardly projecting studs 13 of semicircular cross section on its top side, which fit squarely and slidably against the flat sides of two other studs 14 which extend downwardly from a retainer bar 15. Compression springs 16 are provided on the studs 13 and 14 between the presser plate 11 and the retainer bar 15 to exert a downward pressure on the presser plate when said presser plate is placed within a mold containing meat and the retainer bar is made fast to the mold. The respective ends of the springs 16 are preferably inserted within holes 19 in the bases of the studs 13 and 14 so that the springs serve to prevent total disconnection of the retainer bar and the presser plate.

The retainer bar 15 is secured to the mold by means of multiple toothed latch members 18 of inverted L shape which are connected by pivots 19 with the ends of the retainer bar and which have teeth 20 arranged to engage with external catch lugs 21 on the ends of the mold. The lower sides of the lugs 21 are inclined downwardly a slight amount and the upper sides of the teeth 20 on the latch members are similarly inclined upwardly so that after being placed in engagement they will remain in the engaged position as long as upward pressure is exerted on the retainer bar or until they are disengaged manually. The opposite sides of the teeth 20 and lugs 21 are inclined so as to ride over each other when the retainer bar is pushed down.

The retainer bar 15 is preferably of substantially the same length or of slightly less length than the mold receptacle. The retainer bar 15 and closure member 11 are secured together by the lugs 13—14 and springs 16 and form an assembled cover part which may be handled as a unit in applying it to and removing it from the mold receptacle. The retainer bar forms a convenient handle by which this cover part may be handled.

Each end of the retainer bar 15 is provided with a transverse hole 22, Fig. 5, for the reception of one of the pivots 19 and is further provided with a latch member support 23 which extends outwardly beyond the pivot hole 22. The top of each latch member support 23 is formed of two inclined surfaces 24 and 25 which intersect and form a shallow transverse trough or groove. Each latch member has two spaced apart side plates 26 which extend at approximately right angles to the toothed portion of the latch member and are positioned on opposite sides of the latch member support 23. The pivots 19 extend through holes 27 in the side plates 26 and through the perforation 22 to pivotally secure the latch members to the retainer bar. When looked at from the side the latch members have somewhat the shape of an inverted letter L. An integral transverse bar member 28 extends crosswise between the two side plates 26 in the proper position to engage with and rest upon the latch member support 23 when the toothed portion of the latch member 18 is positioned substantially at right angles to the retainer bar 15. The surface of the transverse bar 28 which engages with the latch member support 23 is formed by two inclined intersecting surfaces conforming to the shape of the surfaces 24 and 25. When the latch member 18 hangs at substantially right angles from the retainer bar 15 the inclined surfaces of the bar member 28 will rest within the trough like support provided by surfaces 24 and 25 of the latch member support and the latch member will be correctly positioned and firmly supported without strain on the pivots 19. As the pivots 19 are relieved of substantially all strain by the latch member support 23 and bar member 28 said pivots may be relatively small and light and do not need to be accurately fitted. The pivots 19 are positioned a substantial distance inwardly from the normally vertical portions of the latch members 18 so that when the retainer bar 15 is held in a horizontal position and the latch members are unrestrained gravity will always tend to swing the lower ends of the latch members 18 inwardly until they are stopped by the bar members 28 resting on the latch member supports 23. When the latch members 18 are thus freely hanging from the retainer bar 15 and the cover device including the plate 11 is applied to the mold receptacle the inclined bottom ends 29 of the latch members will engage with the inclined top surfaces of the lugs 21 and the lower portions of the latch members will first be deflected outwardly, as shown in Fig. 3, after which the teeth of the latch members will drop by gravity into engagement with the lugs 21 as the retainer bar is pressed down. This makes it possible to very quickly and easily apply the closure device to the mold receptacle without taking hold of the latch members.

The retainer bar 15 will ordinarily be pressed down and the springs 16 compressed after the plate 11 rests on the material in the mold receptacle. This places the material in the mold receptacle under pressure and places a tension on the latch members 18. This tension is carried by the latch member supports 23. It will thus be seen that the latch member supports 23 and bar members 28 serve two purposes, namely, to carry the load and relieve the pivots 19 of strain, and to stop or limit the angular movement of the latch members 18.

In Fig. 6, I have shown a modification of the invention in which a sealing type of cover or closure member 30 is used instead of the telescopic closure member 11 shown in Figs. 1 and 2. This cover member 30 has an inclined marginal surface 31 adapted to fit snugly within the inclined top portion 10 of the mold receptacle and also has a flange 32 adapted to rest on the top of the mold receptacle. Also as the cover member 30 always occupies the same position with respects to the mold receptacle the retainer bar 33 is placed closer to said cover member 30 than is the retainer bar 15 of Figs. 1 to 5, and the latch member 34 is shorter and is provided with only one tooth or hook element 35. Otherwise the device shown in Fig. 6, is similar to the device shown in Figs. 1 to 5, and the operation of the same is similar.

The foregoing description and accompanying drawing clearly show a preferred embodiment of my invention but it will be understood that this disclosure is merely illustrative and such changes may be made as are fairly within the scope and spirit of the following claims.

I claim:

1. In a mold of the class described, a mold receptacle having an outwardly projecting hook shaped lug on each end; a closure member for the top portion of said mold receptacle; a retainer bar extending lengthwise of said mold receptacle in spaced relation thereabove; resilient connector means operatively connecting said retainer bar and said closure member; latch members of substantially inverted L shape having teeth positioned to engage with the lugs on the ends of the receptacle; pivot means connecting the upper end portions of said latch members with the end portions of said retainer bar, said pivot means being positioned inwardly from planes common to the ends of said mold receptacle; a latch member support on each end of said retainer bar extending outwardly beyond the adjacent pivot means; and means on each latch member positioned to rest upon and be supported by the adjacent latch member support when the teeth of the latch members are operatively engaged with the lugs on said receptacle, whereby the major portion of the strain on each latch member will be borne by the latch member support and the pivot means connecting the latch member support with the retainer bar thereby relieved of strain.

2. In a mold of the class described, a mold receptacle having an outwardly projecting lug on each end; a closure member for the top of the mold receptacle; a retainer bar extending lengthwise of said mold receptacle in spaced relation above the top thereof and terminating substantially flush with the ends of said receptacle; resilient connector means connecting said retainer bar and said closure member, said connecting means including compression springs interposed between the retainer bar and the closure member; latch members of substantially inverted L shape carried by the retainer bar and having teeth positioned to engage with the lugs on the ends of said receptacle; pivot means connecting the upper end portions of said latch members with the end portions of said retainer bar, said pivot means being positioned inwardly from upright planes passing substantially through said lugs; a latch member support extending outwardly beyond the pivot means at each end of said retainer bar, each latch member support having a transverse groove therein; and means rigid with each latch member positioned to rest upon and be supported by the adjacent latch member support when the teeth of the latch member are engaged with a lug on the mold receptacle, said rigid means fitting within the transverse groove in the latch member support.

JOSEPH KIPPER.